3,379,784
**PROCESS FOR PREPARING POLYALKYL-
TETRAHYDRONAPHTHALENES**
Samuel J. Kahn, Rutherford, N.J., assignor to Universal
Oil Products Company, Des Plaines, Ill., a corporation
of Delaware
No Drawing. Filed Nov. 4, 1965, Ser. No. 506,403
10 Claims. (Cl. 260—668)

---

ABSTRACT OF THE DISCLOSURE

Preparation of polyalkyltetrahydronaphthalene by gradually adding an alpha-methylstyrene and a 2,3-dimethylbutene to a mixture of activated clay catalyst and an aromatic hydrocarbon solvent maintained at a temperature of 90°–120° C.

---

This invention relates to a process for preparing polyalkyltetrahydronaphthalenes and more particularly to a process for preparing 1,1,3,4,4-pentamethyl-6-alkyltetrahydronaphthalenes.

Polyalkyl substituted 1,2,3,4-tetrahydronaphthalenes are valuable compounds, particularly in the perfume industry, due to the fact that these compounds, upon acylation have odors which closely resemble the highly expensive naturally occurring macrocyclic musks such as muscone or civetone.

Heretofore, polyalkyltetrahydronaphthalenes and especially polyalkyltetrahydronaphthalenes which are acylated for use in perfumery have been prepared principally either by a cyclialkylization method such as, for example, the condensation of a 2,5-dihalo-2,5-dimethylhexane with an alkyl substituted benzene in the presence of a Friedel-Crafts catalyst or by a cyclodehydration method such as, for example, the cyclization of a tertiary alcohol such as 1,1,2,4-tetramethyl-4-(p-tolyl)-pentanol in the presence of an acid catalyst. Another method of synthesis which recently has become of interest primarily due to the fact that the specific type of polyalkyltetrahydronaphthalenes produced thereby, upon acylation, possesses an extremely desirable musk-like odor is a method which utilizes a p-cymylcarbonium ion intermediate. In this method of synthesis, a p-cymylcarbonium ion, formed either by a hydride transfer from p-isopropyltoluene or by the addition of a proton to a dimethyl-p-tolylcarbinol or p-alpha-dimethylstyrene, is reacted in the presence of a strong acid catalyst such as concentrated sulfuric acid at a low temperature of the order of about 0° to 30° C. with olefins or alcohols such as 2,3-dimethylbutenes or 2,3-dimethyl-2-butanol to form the polyalkyltetrahydronaphthalene.

While the p-cymylcarbonium ion method of synthesis is the most straightforward method for preparing the polyalkyltetrahydronaphthalenes having the most desirable structure, namely 1,1,3,4,4,6-hexaalkyl-1,2,3,4-tetrahydronaphthalenes, for subsequent acylation to obtain compounds possessing fine musk-like odors, it nevertheless has not found wide commercial acceptance. The principal reason for this is that the reaction is extremely costly to carry out, and this is mostly due to the fact that the conversion of the very expensive reactants to product is very low usually of the order of about 30 percent. Moreover, even the small amount of product produced is very difficult and costly to recover in pure form from the reaction mass containing copious quantities of side products. This problem of high cost is also compounded by the fact that the unreacted, highly expensive 2,3-dimethylbutene starting material is not recoverable for reuse in any appreciable quantities because of its substantial consumption in the formation of product-contaminating side products. It has now been discovered, however, that polyalkyltetrahydronaphthalenes may be prepared according to the carbonium ion method of synthesis, with high conversions of reactants and, moreover, in remarkably good yields with recoverable and reusable 2,3-dimethylbutene starting material, by utilizing an activated, naturally occurring clay catalyst in combination with unusually high temperatures and a specific reaction procedure to effect the reaction of a substituted styrene compound and a 2,3-dimethylbutene.

Accordingly, an object of this invention is to provide a process for preparing polyalkyltetrahydronaphthalenes useful as intermediates in the preparation of acylated polyalkyltetrahydronaphthalenes having fine musk-like odors. Another object is to provide a process for preparing polyalkyltetrahydronaphthalenes involving the reaction of a substituted styrene and a 2,3-dimethylbutene which is effected at elevated temperatures in the presence of an activated, naturally occurring clay according to a specific reaction procedure whereby the tetrahydronaphthalene product is obtained economically in high yield simultaneously with readily recoverable and reusable dimethylbutene starting material. Other objects of this invention will become apparent from the following further-detailed description thereof.

The polyalkyltetrahydronaphthalenes prepared according to the process of this invention may be represented by the following structural formula

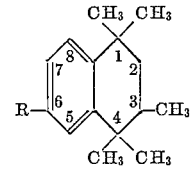

in which R is hydrogen or a lower alkyl radical of from 1 to about 5 carbon atoms. Examples of polyalkyltetrahydronaphthalenes having this structure include: 1,1,3,4,4-pentamethyl - 1,2,3,4-tetrahydronaphthalene; 1,1,3,4,4,6-hexamethyl - 1,2,3,4 - tetrahydronaphthalene; 1,1,3,4,4-pentamethyl - 6-ethyl-1,2,3,4-tetrahydronaphthalene; 1,1,3,4,4 - pentamethyl - 6-isopropyl-1,2,3,4-tetrahydronaphthalene; or 1,1,3,4,4 - pentamethyl - 6-tertiarylbutyl-1,2,3,4-tetrahydronaphthalene.

The polyalkyltetrahydronaphthalenes having the above general structure are prepared by reacting a substituted styrene compound with a 2,3-dimethylbutene. This reaction is effected according to the process of this invention at a temperature of from about 90° C. to 120° C. in the presence of an activated, naturally occurring clay and according to the procedure of gradually contacting both the styrene compound and the 2,3-dimethylbutene with the catalyst in the presence of an aromatic hydrocarbon solvent. The substituted styrene compounds which may be used in this reaction have the following structural formula

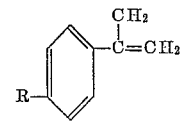

wherein R has the same meaning as is given above for the polyalkyltetrahydronaphthalene structure. Examples of the substituted styrene compounds include α-methylstyrene; p - α - dimethylstyrene; p - ethyl - α - methylstyrene; p - isopropyl - α - methylstyrene; or p - tertiarybutyl - α - methylstyrene. The styrene compound need not be of extremely high purity and, conveniently, relatively impure mixtures containing as low as 80 percent of the styrene compound may be readily utilized in the process of this invention without substantial reduction in product yield.

The 2,3-dimethylbutene reactant which may be used in the process of this invention comprises either 2,3- dimethylbutene-1 or 2,3-dimethylbutene-2 or any mixture thereof. While the 2,3-dimethylbutene-1, according to carbonium ion theory, is the olefin isomer required for the polyalkyltetrahydronaphthalene formation, it is also possible to use 2,3-dimethylbutene-2 inasmuch as the 2-isomer will rearrange by isomerization under the conditions of the process of this invention to form the 1-isomer. Accordingly, the 2,3-dimethylbutene reactant may comprise either the 1 or 2 isomer or any mixture thereof. A suitable 2,3-dimethylbutene reactant comprising a mixture of the 1 and 2 isomers which may be used in the reaction may be readily obtained from the dehydrohalogenation and isomerization of neohexyl chloride.

The reaction of the substituted styrene compound and the 2,3-dimethylbutene effected according to the process of this invention may be illustrated by the following equation using, for illustrative purposes only, p-α-dimethylstyrene as the styrene reactant to form 1,1,3,4,4,6-hexamethyl-1,2,3,4-tetrahydronaphthalene

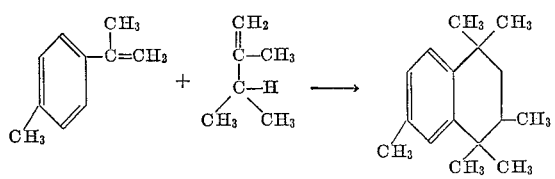

It is, of course, obvious from the above equation that different polyalkyltetrahydronaphthalenes will be produced depending upon the particular styrene compound used in the reaction. For example, if p-ethyl-α-methylstyrene is used then 1,1,3,4,4-pentamethyl-6-ethyl-1,2,3,4-tetrahydronaphthalene will be produced, and if p-isopropyl-α-methylstyrene, then 1,1,3,4,4-pentamethyl-6-isopropyl-1,2,3,4-tetrahydronaphthalene will be produced.

The catalysts which are used in combination with the elevated temperatures and reaction procedure according to the process of this invention to achieve the highly desirable results of producing excellent yields of polyalkyltetrahydronaphthalenes simultaneously with readily recoverable and reusable, unreacted 2,3-dimethylbutene starting materials comprise activated, naturally occurring clays. These clays, in general, are hydrated alumina silicates which contain various proportions of silica and alumina and often also various admixtures of the oxides of iron, magnesium, titanium or calcium and which have been chemically activated by treatment with a mineral acid such as sulfuric or hydrochloric acid. These clays in general include the various types of bentonite clays such as the montmorillonite type clays, generally described as a subclass or mineral constituent of bentonite clays, which are found throughout the world, although obtained commercially chiefly from deposits in Germany and the western parts of the United States. Other types of clays, such as the halloysites and the kaolinites as well as fuller's earth or the attapulgite type clays may be used in the process although the results obtained are not generally as desirable as those obtained with the montmorillonite-type clays.

The acid activation of these clays is well known to those skilled in the art and is described in many technical articles and patents such as BIOS Final Rep. 398, p. 4, Proceedings of Sud-Chemie A.G., Houben-Weyl, Methoden der Organischen Chemie 4th Ed., vol. 4, pt. 2 p. 149 (1955); Science of Petroleum, 3:1699–1705 (1938) and United States Patents No. 2,671,058 and No. 1,642,871. This acid activation treatment is effected in general by slurrying the raw clay with aqueous sulfuric or hydrochloric acid at high temperatures followed by filtering and washing the residue and finally drying the clay at elevated temperatures.

The montmorillonite type clays, which are the clays preferably used in the process of this invention, are readily available commercially in activated form under such trade names as "Super Filtrol" and "Tonsil." Typical analyses of "Super Filtrol" which is activated with sulfuric acid and "Tonsil" which is activated with hydrochloric acid are as follows:

Super Filtrol

| Component: | Weight percent |
|---|---|
| $SiO_2$ | 66.6 |
| $Al_2O_3$ | 15.4 |
| MgO | 4.3 |
| $Fe_2O_3$ | 2.3 |
| CaO | 2.2 |
| $TiO_2$ | 0.4 |
| $SO_3$ | 3.0 |
| Volatiles | 3.8 |

Tonsil

| | |
|---|---|
| $SiO_2$ | 72.5 |
| $Al_2O_3$ | 14.0 |
| MgO | 1.5 |
| $Fe_2O_3$ | 4.0 |
| CaO | 0.8 |
| Volatiles | 7.2 |

Since the activated clay catalysts used in the process of this invention have a tendency to readily absorb moisture, and since moisture levels above about 15 percent by weight in the catalysts have a tendency to unfavorably affect the reaction, it is necessary that precautions be taken to assure that the moisture content of the catalysts does not substantially exceed this level.

The solvent which is used in the process of this invention to facilitate the reaction of the styrene compound and the 2,3-dimethylbutene comprises an aromatic hydrocarbon such as, for example, benzene, toluene, ethylbenzene, or a xylene. The use of such aromatic solvent at the elevated temperatures used in the process of this invention is most surprising, however, as it normally would be expected that the 2,3-dimethylbutene reactant would be consumed through alkylation of the aromatic solvent and would thus lower the product yield and preclude recovery of any unreacted 2,3-dimethylbutenes not consumed in the tetrahydronaphthalene formation. Actually, however, such is not the case as there is little, if any, 2,3-dimethylbutene alkylation of the aromatic solvent; and the 2,3-dimethylbutenes, not reacted in the tetrahydronaphthalene formation, are readily recoverable.

As hereinbefore indicated the temperature at which the reaction is effected is very important to the success of the process. The temperature which is used must be above about 90° C. and should not substantially exceed above about 120° C. The use of temperatures outside this range and, in particular, above this range results in a substantial reduction in the yield of tetrahydronaphthalene obtained. The most preferable temperature within the above range utilized for the reaction will vary, depending upon such factors as the particular reactants used, the type of solvent presented in the mixture and the particular clay catalyst utilized. Generally, however, the temperature range is preferably maintained within from about 100° C. to 115° C. for optimum results.

The use of such relatively high temperatures in the process of this invention is most surprising, however, as it was heretofore necessary in the preparation of polyalkyltetrahydronaphthalenes involving the reaction of a 2,3-dimethylbutene with styrene to effect the reaction at very low temperatures of the order of about 0° to 30° C. to prevent the olefins from polymerizing and the styrenes from dimerizing to the severe detriment of the polyalkyltetrahydronaphthalene formation. A possible explanation for the successful use of high temperatures in the process of this invention is that the activated clay catalysts at such temperatures in some way favor the reaction of the 2,3-dimethylbutene and the styrene to form the desired polyalkyltetrahydronaphthalene and not the side reactions of polymerization and dimerization of the reactants which deleteriously affect the tetrahydronaphthalene formation.

The ratio of the reactants used in the process of this invention is not critical, and generally a stoichiometric quantity of about one mol of the styrene compound to about one mol of the 2,3-dimethylbutene may be conveniently utilized although the results are frequently improved by using a slight excess of the styrene compound. The quantity of the catalyst is also not critical and the amount used will vary depending upon such factors as the particular catalyst used, the reactants and the reaction rate desired. Generally, however, the amount of catalyst may range from about 2 to 50 percent by weight of the 2,3-dimethylbutene reactant with amounts ranging from about 5 to 10 percent generally being more conveniently utilized. The amount of solvent, preferably an aromatic hydrocarbon such as toluene, should be at least sufficient to render the mixture of reactants and clay catalyst readily stirrable. Generally, about one-half to one weight part of solvent per one weight part of styrene compound is suitable for this purpose. Advantageously, the reaction is effected under atmospheric pressures, but may, when necessitated by the particular solvent used, also be effected under super- or subatmospheric pressures.

In carrying out the process of this invention it is essential to the success of process that a procedure be followed in which both the styrene compound and the 2,3-dimethylbutene are gradually brought into reactive contact with the catalyst. In a batch-type system this may be conveniently effected by gradually adding the styrene and the butene, either in admixture or in separate streams, to a mixture of the catalyst and solvent maintained at the desired temperature. The time required for the addition of the styrene and the butene will vary depending upon such factors as the particular reaction temperature, the reactants, the catalyst used and the degree of mixing, but generally ranges from about 1 to 10 hours with addition times of from about 3 to 6 hours being more desirable at the preferred temperature range of from about 100° C. to 115° C. At the end of the addition, it is not generally necessary to continue the heating of the reaction mixture for any substantial period as the reaction by then, is usually complete. It may be necessary in certain instances, however, and particularly when using low reaction temperatures and short addition periods to finish the reaction after completion of the addition by continuing the heating of the reaction mixture within the desired temperature range for a short additional period of about one-half to one hour.

When the reaction is complete, the product mixture is separated from the catalyst by conventional methods such as decantation or filtration which, because the catalyst used in the process is a solid, is readily and economically achieved. Because of the uniqueness of the process of this invention which permits the formation of large quantities of tetrahydronaphthalene product without destruction of the valuable, unreacted 2,3-dimethylbutenes in forming large amounts of tetrahydronaphthalene-contaminating side products, the tetrahydronaphthalene product, the unreacted 2,3-dimethylbutenes and the solvent may be readily recovered from the catalyst-free product mixture by simple fractionation. The tetrahydronaphthalene product fraction may then be recrystallized from a solvent such as isopropyl alcohol to obtain a high yield of pure polyalkyltetrahydronaphthalene.

As hereinbefore indicated, the process of this invention, effected with an activated clay catalyst at highly elevated temperatures and according to a specific reaction procedure, has the amazing characteristic of permitting the reaction to take place principally between the styrene and the 2,3-dimethylbutene to form the desired polyalkyltetrahydronaphthalene with low loss of the unreacted 2,3-dimethylbutene through side product formation or alkylation of the aromatic solvent. This results in the highly desirable feature of being able to recover the 2,3-dimethylbutenes for reuse which adds considerably to the overall desirability of the process of this invention by greatly lowering the cost of preparing polyalkyltetrahydronaphthalenes.

The polyalkyltetrahydronaphthalenes prepared according to the process of this invention as hereinbefore indicated may be acylated to obtain acylated polyalkyltetrahydronaphthalenes having very fine, musk-like odors which render them highly valuable for use in perfumery. The acylation may be effected according to conventional methods such as by reacting the polyalkyltetrahydronaphthalene with an acyl halide or acid anhydride in the presence of an acid-acting catalyst. Examples of the acylated polyalkyltetrahydronaphthalenes include 7-acetyl-1, 1,3,4,4,6-hexamethyl-1,2,3,4-tetrahydronaphthalene or 7-acetyl - 1,1,3,4,4 - pentamethyl-6-ethyl-1,2,3,4-tetrahydronaphthalene.

The following examples are given to illustrate the process of this invention, but they are not intended to limit the generally broad scope of this invention in strict accordance therewith.

EXAMPLE I 1,1,3,4,4,6 - hexamethyl-1,2,3,4-tetrahydronaphthalene was prepared according to the process of this invention by the following procedure:

About 875 grams of toluene and about 35 grams of an activated montmorillonite clay (Super Filtrol) having a moisture content of about 9.3 weight percent were charged to a reaction flask equipped with heating and stirring means. The temperature of the slurry was raised to about 100° C. and with stirring a mixture comprising about 975 grams of p-α-dimethylstyrene (88 percent by weight, 6.5 mols) and about 442 grams of an olefinic mixture containing 95 percent by weight of a mixture of the 1 and 2 isomers of 2,3-dimethylbutene (5.0 mols) was gradually added over a period of about 5 hours with the temperature rising to about 109° C. at the end of the addition. The reaction mixture at the completion of the addition was then refluxed for a short period (about one-half hour) and thereafter cooled to about 25° C. The liquid reaction product was decanted from the catalyst layer to recover about 2285 grams of a liquid product mixture. The mixture was treated with about 5 grams of sodium carbonate and then fractionated under vacuum to recover about 802 grams of a toluene-2,3-dimethylbutene fraction analyzing by gas-liquid chromatography (G.L.C.) as containing 8.3 percent of the 2,3-dimethylbutenes or 0.79 mol and about 893 grams of a product fraction analyzing by G.L.C. as containing 76.5 percent of tetrahydronaphthalene or 3.19 mols. Accordingly, the yield of tetrahydronaphthalene on consumed 2,3-dimethylbutene was 75.7 percent and the conversion was 63.8 percent.

The tetrahydronaphthalene product was recovered from the product fraction by mixing the fraction with about 893 grams of isopropyl alcohol at 50° C. followed by cooling to about 0° C. The solid tetrahydronaphthalene product was then filtered from the alcohol solution, washed several times with isopropyl alcohol precooled to 0° C., and dried to recover about 570 grams of 1,1,3, 4,4,6-hexamethyl-1,2,3,4-tetrahydronaphthalene of 99.5 percent purity having a melting point of 65° to 66° C.

EXAMPLE II 1,1,3,4,4,6 - hexamethyl-1,2,3,4-tetrahydronaphthalene was prepared according to the process of this invention by the following procedure:

About 175 grams of toluene and 7.0 grams of an activated montmorillonite clay (Tonsil) having a moisture content of about 14.9 weight percent were charged to a reaction flask equipped with heating and stirring means. The temperature of the slurry was raised to about 102° C. and with stirring a mixture comprising about 180 grams of p,α-dimethylstyrene (95 percent by weight, 1.3 mols) and about 84 grams of a mixture of the 1 and 2 isomers of 2,3-dimethylbutene (1.0 mol) was gradually added over a period of about 5 hours with the temperature rising to about 113° C. at the end of the addition. After completion of the addition, the reaction mixture was then refluxed for a short period (about one-half hour) and thereafter cooled to about 25° C. The liquid reaction product was decanted from the catalyst layer to recover about 449 grams of a liquid product mixture. The mixture was treated with about 2 grams of sodium carbonate and then fractionated under vacuum to recover about 162 grams of a toluene-2,3-dimethylbutene fraction analyzing 16.2 percent as 2,3-dimethylbutenes or 0.311 mol and about 156 grams of a product fraction analyzing 75 percent of tetrahydronaphthalene or 0.538 mol. Accordingly, the yield of tetrahydronaphthalene on consumed 2,3-dimethylbutene was 78.2 percent and the conversion was 53.8 percent.

The tetrahydronaphthalene product was recovered from the product fraction by mixing the fraction with about 155 grams of isopropyl alcohol at 50° C. followed by cooling to about 0° C. The solid tetrahydronaphthalene product was then filtered from the alcohol solution, washed several times with isopropyl alcohol precooled to 0° C., and dried to recover about 95 grams of 1,1,3,4,4,6-hexamethyl-1,2,3,4-tetrahydronaphthalene of 99.2 percent purity having a melting point of 65° to 66° C.

EXAMPLE III 1,1,3,4,4 - pentamethyl-6-ethyl-1,2,3,4-tetrahydronaphthalene is prepared according to the process of this invention by the following procedure.

About 875 grams of toluene and about 35 grams of an activated montmorillonite clay (Super Filtrol) having a moisture content of about 9.3 weight percent are charged to a reaction flask equipped with heating and stirring means. The temperature of the slurry is raised to about 100° C. and with stirring a mixture comprising about 950 grams of p-ethyl-α-methylstyrene (6.5 mols) and about 442 grams of an olefinic mixture containing 95 percent by weight of a mixture of the 1 and 2 isomers of 2,3-dimethylbutene (5.0 mols) is gradually added over a period of about 5 hours. After the addition is completed the reaction mixture is then refluxed for a short period (about one-half hour) and thereafter cooled to about 25° C. The liquid reaction product is decanted from the catalyst layer to recover a liquid product mixture. The mixture is treated with about 5 grams of sodium carbonate and then fractionated under vacuum to recover a toluene-2,3-dimethylbutene fraction and a product fraction boiling at 102–105° C. at 2 mm. Hg and having a refractive index of $n_D^{20}$ 1.515–1.516.

I claim as my invention:

1. A process for preparing a polyalkyltetrahydronaphthalene of the formula

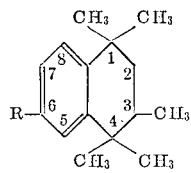

where R is a substituent selected from the group consisting of hydrogen and an alkyl radical of from 1 to about 5 carbon atoms which comprises gradually adding an α-methylstyrene substituted in the para position with an R substituent as defined above and a 2,3-dimethylbutene to a mixture of a catalyst comprising an activated clay and an aromatic hydrocarbon solvent maintained at a temperature of from about 90° to 120° C., reacting said styrene and butene at said temperature, and thereafter recovering the polyalkyltetrahydronaphthalene from the reaction mixture.

2. The process according to claim 1 wherein the styrene compound is p-α-dimethylstyrene and the polyalkyltetrahydronaphthalene prepared is 1,1,3,4,4,6-hexamethyl-1,2,3,4-tetrahydronaphthalene.

3. The process according to claim 1 wherein the 2,3-dimethylbutene comprises a mixture of 2,3-dimethylbutene-1 and 2,3-dimethylbutene-2.

4. The process according to claim 1 wherein the catalyst comprises an activated montmorillonite clay.

5. The process according to claim 1 wherein the aromatic hydrocarbon solvent is toluene.

6. The process according to claim 1 wherein the styrene compound and the 2,3-dimethylbutene are gradually contacted with the catalyst by adding the styrene compound and the 2,3-dimethylbutene to a mixture of the solvent and the catalyst over a period of from about 1 to 10 hours.

7. The process according to claim 1 wherein the temperature is from about 100° C. to 115° C.

8. The process according to claim 1 wherein 1,1,3,4,4,6-hexamethyl-1,2,3,4-tetrahydronaphthalene is prepared by gradually adding p-α-dimethylstyrene and a 2,3-dimethylbutene comprising a mixture of the 1 and 2 isomers thereof over a period of from about 1 to 10 hours to a mixture of an aromatic hydrocarbon solvent and a catalyst comprising an activated montmorillonite clay at a temperature of from about 90° to 120° C. and thereafter recovering the hexamethyltetrahydronaphthalene from the reaction mixture.

9. The process according to claim 8 wherein the aromatic hydrocarbon solvent is toluene.

10. The process according to claim 8 wherein the 2,3-dimethylbutene and the p-α-dimethylstyrene are gradually added over a period of from about 3 to 6 hours and at a temperature of from about 100° C. to 115° C.

References Cited

UNITED STATES PATENTS

| | | | |
|---|---|---|---|
| 2,851,501 | 9/1958 | Benz et al. | 260—668 |
| 3,037,052 | 5/1962 | Bortnick | 260—671 XR |
| 3,161,692 | 12/1964 | McLaughlin et al. | 260—669 XR |
| 3,246,044 | 4/1966 | Wood et al. | 260—668 |
| 3,278,621 | 10/1966 | Stofberg et al. | 260—668 |

OTHER REFERENCES

Wood et al., J. Org. Chem., vol. 28, September 1963; pp. 2248–2255, QD 241. J6.

DELBERT E. GANTZ, *Primary Examiner.*

C. R. DAVIS, *Assistant Examiner.*